(12) United States Patent
Peak

(10) Patent No.: US 9,638,303 B2
(45) Date of Patent: May 2, 2017

(54) DOUBLE DISCONNECT FRONT DIFFERENTIAL

(71) Applicant: GM GLOBAL TECHNOLOGY OPERATIONS LLC, Detroit, MI (US)

(72) Inventor: Jess R. Peak, Brighton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 14/645,550

(22) Filed: Mar. 12, 2015

(65) Prior Publication Data
US 2016/0265639 A1  Sep. 15, 2016

(51) Int. Cl.
*F16H 48/08* (2006.01)
*B60K 23/08* (2006.01)

(52) U.S. Cl.
CPC ............. *F16H 48/08* (2013.01); *B60K 23/08* (2013.01); *F16H 2048/082* (2013.01)

(58) Field of Classification Search
USPC ........................................................ 475/220
See application file for complete search history.

(56) References Cited

U.S. PATENT DOCUMENTS

| | | | | |
|---|---|---|---|---|
| 2,913,929 A | * | 11/1959 | Anderson | B60K 17/352 180/247 |
| 4,625,584 A | * | 12/1986 | Onodera | B60K 17/352 180/247 |
| 5,996,720 A | * | 12/1999 | Hunt | B60K 23/08 180/247 |
| 2003/0019672 A1 | * | 1/2003 | Borgen | B60K 23/08 180/24.1 |
| 2003/0047403 A1 | * | 3/2003 | Borgen | B60K 17/34 192/50 |

* cited by examiner

*Primary Examiner* — Justin Holmes
*Assistant Examiner* — Timothy M Hannon
(74) *Attorney, Agent, or Firm* — Cantor Colburn LLP

(57) ABSTRACT

A front differential double disconnect includes a front differential having a first side gear and a second side gear, a first shaft having a first gear configured to selectively engage the first side gear, a second shaft having a second gear, and a third shaft disposed between the first shaft and the second shaft. The third shaft includes a third gear configured to engage the second side gear and selectively engage the second gear. The first shaft is shiftable between a first position where the first gear does not engage the first side gear, and a second position where the first gear meshingly engages the first side gear to transmit rotational movement therebetween.

19 Claims, 3 Drawing Sheets

DOUBLE DISCONNECT FRONT DIFFERENTIAL

FIELD OF THE INVENTION

The subject invention relates to front differential disconnect systems and, more specifically, to a front differential double disconnect system.

BACKGROUND

Four-wheel drive vehicles provide improved traction on roads such as those covered in snow, ice, and mud. Four-wheel drive vehicles may be provided with an axle shift mechanism to selectively disconnect a secondary driving axle in order to provide a two-wheel drive mode when using four-wheel drive mode is not beneficial. However, some components of a front differential may still rotate when the vehicle is in two-wheel drive, which may result in scoring and losses due to the rotating gears and axle shafts connected thereto.

SUMMARY OF THE INVENTION

In one aspect, a front differential double disconnect system is provided. The disconnect system includes a front differential having a first side gear and a second side gear, a first shaft having a first gear configured to selectively engage the first side gear, a second shaft having a second gear, and a third shaft disposed between the first shaft and the second shaft. The third shaft includes a third gear configured to engage the second side gear and selectively engage the second gear. The first shaft is shiftable between a first position where the first gear does not engage the first side gear, and a second position where the first gear meshingly engages the first side gear to transmit rotational movement therebetween.

In another aspect, a vehicle is provided. The vehicle includes a body, a front axle housing, a front differential disposed in the front axle housing and having first side gear and a second side gear, a first shaft having a first gear configured to selectively engage the first side gear, a second shaft having a second gear, and a third shaft disposed between the first shaft and the second shaft, the third shaft having a third gear configured to engage the second side gear and selectively engage the second gear. The first shaft is shiftable between a first position where the first gear does not engage the first side gear, and a second position where the first gear meshingly engages the first side gear to transmit rotational movement therebetween.

In yet another aspect, a method assembling a front differential double disconnect system is provided. The method includes providing a front differential having a first side gear and a second side gear, providing a first shaft having a first gear configured to selectively engage the first side gear, providing a second shaft having a second gear, and disposing a third shaft between the first shaft and the second shaft, the third shaft having a third gear configured to engage the second side gear and selectively engage the second gear. The first shaft is shiftable between a first position where the first gear does not engage the first side gear, and a second position where the first gear meshingly engages the first side gear to transmit rotational movement therebetween.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DETAILED DESCRIPTION

Figure 1:
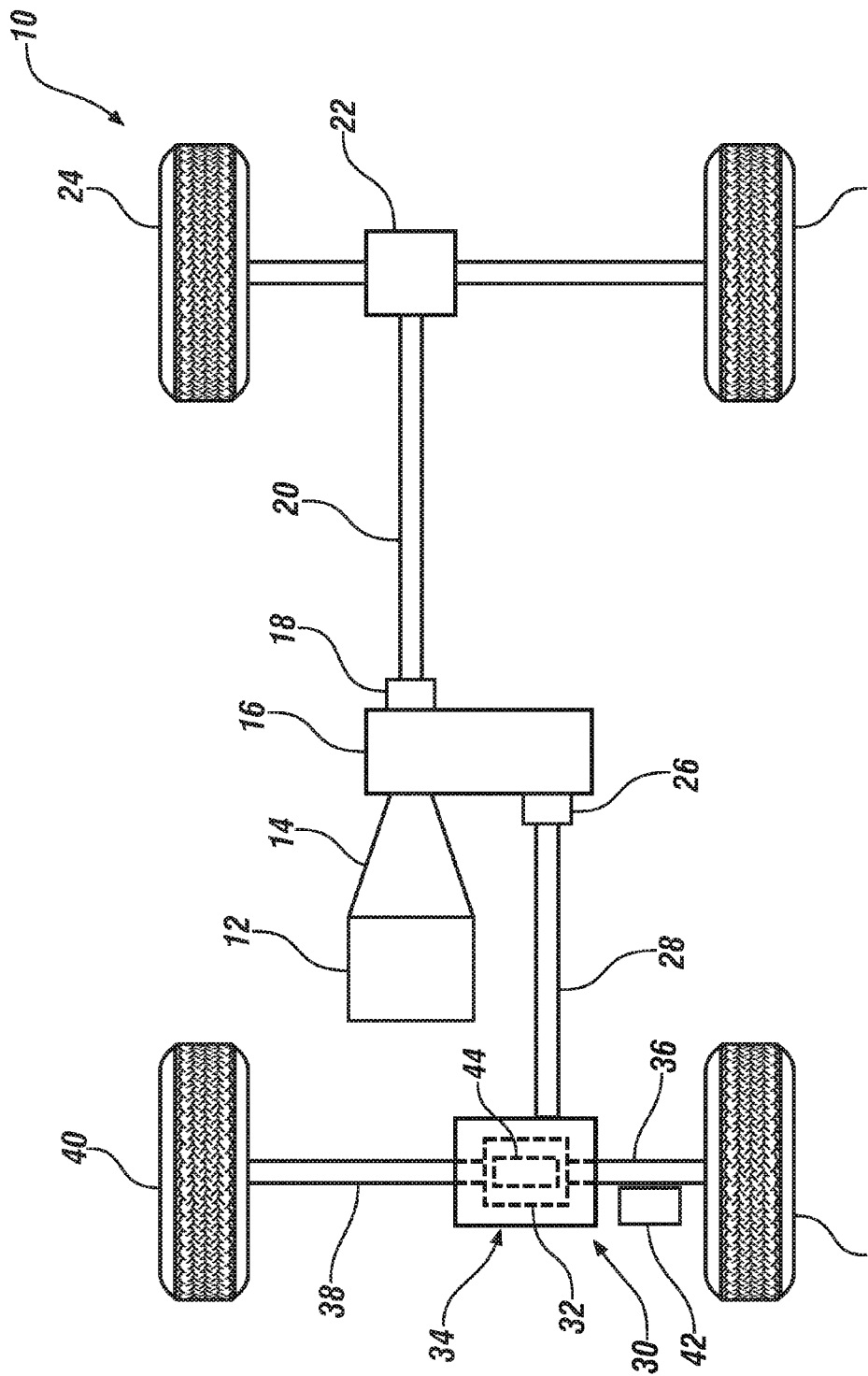
FIG. 1 is a schematic view of an exemplary vehicle.

FIG. 1 illustrates a schematic view of an exemplary part-time four-wheel drive vehicle 10 that generally includes an internal combustion engine 12, a transmission 14, and a transfer case 16 to receive drive torque from engine 12 and transmission 14. A transfer case first output member 18 is drive connected to a rear driveshaft 20, which in turn is drivingly connected to a rear differential 22. The rear differential 22 drives rear wheels 24 in a known manner. A transfer case second output member 26 is drive connected to a front drive shaft 28, which in turn is connected to a front differential double disconnect system 30. Double disconnect system 30 includes a front differential 32 disposed in a front axle housing 34, a left shaft 36 and a right shaft 38 each connected to front differential 32 at one end and to a front wheel 40 at an opposite end, and a disconnect actuator 42. Front differential double disconnect system 30 selectively disconnects front differential 32 from shafts 36, 38 to facilitate preventing unwanted driving of components of front differential 32.

Figure 2:
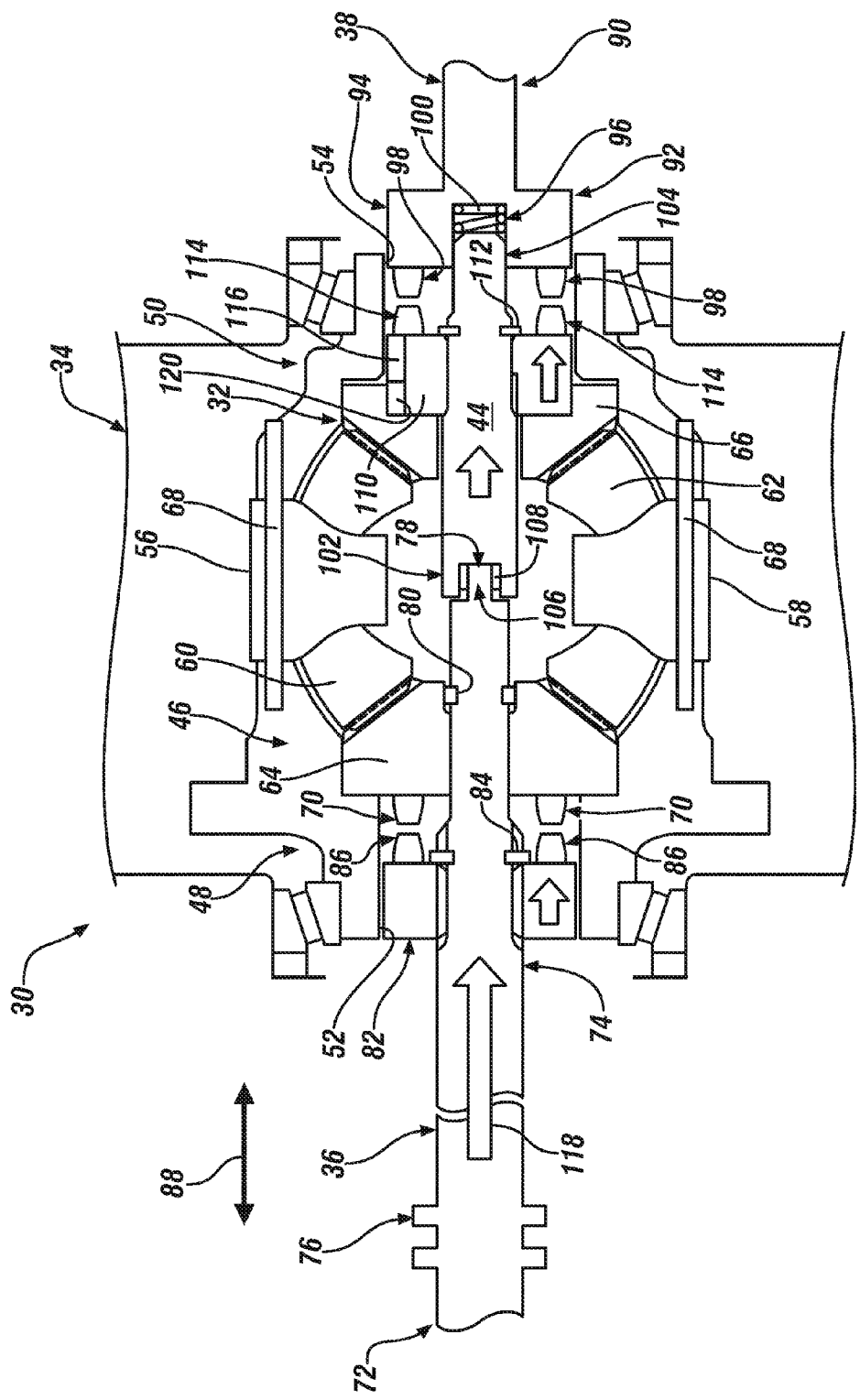
FIG. 2 is a perspective view of an exemplary front differential double disconnect system shown in FIG. 1 in a first configuration.

FIG. 2 illustrates an exemplary schematic view of front differential double disconnect system 30. As shown, system 30 includes front axle housing 34, front differential 32, a first or left output shaft 36, a second or right output shaft 38, and a third or intermediate shaft 44.

Front axle housing 34 defines a cavity 46 and includes a left side 48 and a right side 50. Left side 48 includes an inner diameter 52 to receive left output shaft 36, and right side 50 includes an inner diameter 54 to receive right output shaft 38.

Front differential 32 generally includes a first differential post 56, a second differential post 58, a first pinion gear 60, a second pinion gear 62, a first side gear 64, and a second side gear 66. First and second differential posts 56, 58 are coupled to housing 34, for example, with a rolling pin 68. Pinion gears 60, 62 are rotatably coupled to respective differential posts 56, 58, and pinion gears 60, 62 are meshingly engaged with side gears 64, 66. Side gear 64 includes curvic teeth 70 that form a portion of a curvic coupling. Alternatively, hirth teeth may be used instead of curvic teeth throughout system 30 to form a hirth coupling. Curvic teeth are high-precision gear teeth formed in a concave shape and allow for axial connections. Hirth teeth are similar in that they also allow for face-to-face connections, but hirth teeth are flat and pointed instead of convex/concave. However, system 30 may utilize other suitable gear connections such as, for example, dog clutch connections.

Left output shaft 36 includes a first end 72, an opposite second end 74, and an actuator connection 76. First end 72 is configured to directly or indirectly couple to left front wheel 40. Second end 74 extends into front axle housing 34 and includes a smaller diameter end connection 78 configured to selectively engage intermediate shaft 44. First side gear 64 is disposed about shaft 36 and may include a snap ring 80 disposed therebetween. A curvic gear 82 is press-fit onto shaft 36, for example, at a splined portion of shaft 36, and curvic gear 82 is retained on shaft 36 at least partially by a retaining ring 84. As such, curvic gear 82 rotates with left output shaft 36. Curvic gear 82 includes curvic teeth 86 that meshingly engage with curvic teeth 70 of first side gear 64.

Figure 3:
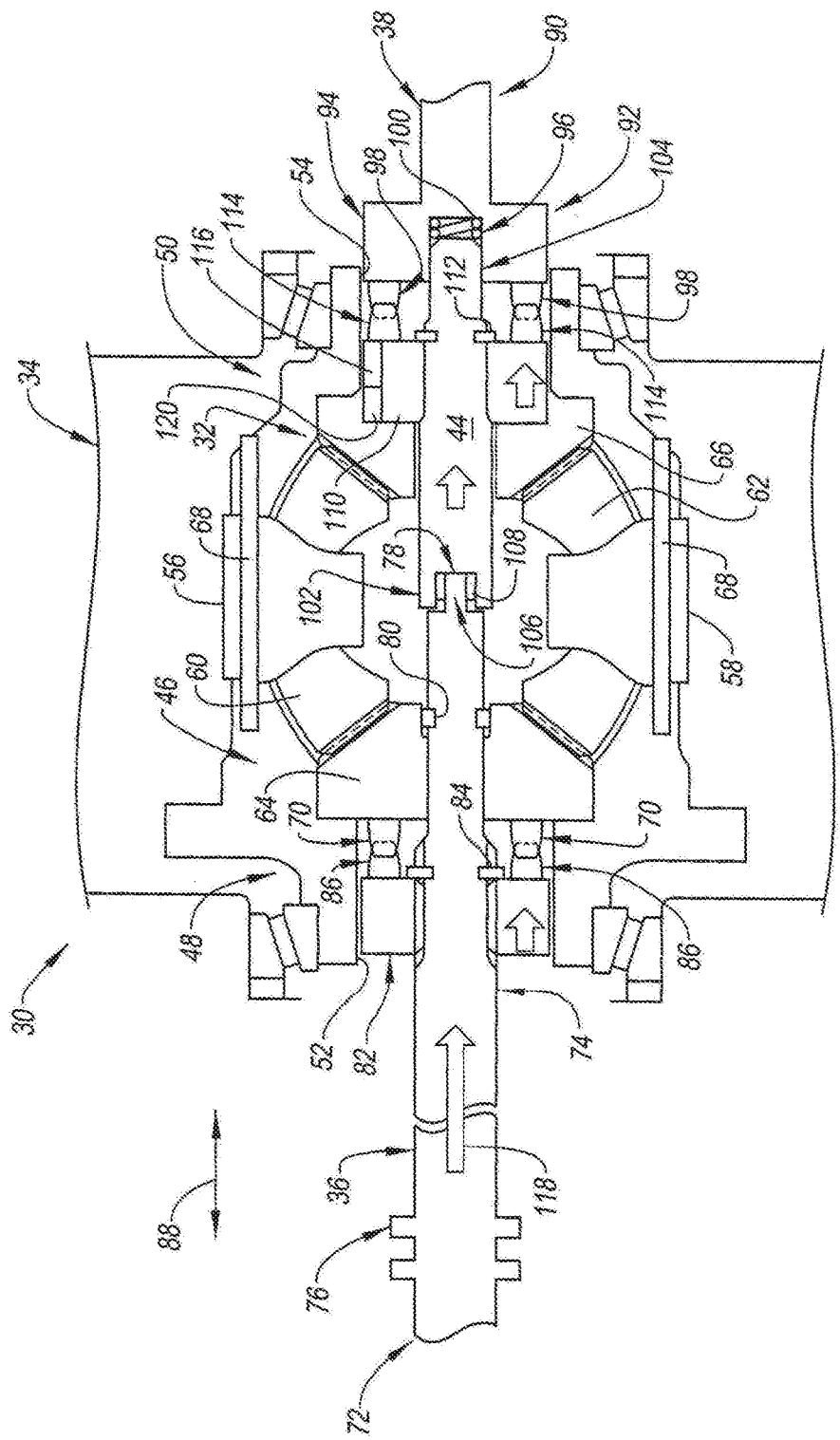
FIG. 3 is a perspective view of an exemplary front differential double disconnect system shown in FIG. 1 in a second configuration.

Actuator connection 76 is configured to be engaged by disconnect actuator 42 to move left output shaft 36 in the left/right directions (shown by arrows 88) between a disengaged or uncoupled position (FIG. 2) and an engaged or coupled position (FIG. 3), as described herein in more detail.

Right output shaft 38 includes a first end 90 and an opposite end 92. First end 90 is configured to directly or indirectly couple to right front wheel 40. Second end 92 extends into front axle housing 34 and includes a coupling portion 94 that includes a receiving aperture or bore 96 and curvic gear teeth 98. Receiving bore 96 is configured to receive intermediate shaft 44 and includes a biasing mechanism 100 disposed therein. Biasing mechanism 100 is configured to bias intermediate shaft 44 toward left output shaft 36. In one embodiment, biasing mechanism 100 is a helical spring seated within receiving bore 96.

Intermediate shaft 44 extends through a center of front differential 32 and includes a first end 102 and an opposite second end 104. First end 102 includes a receiving bore or aperture 106 configured to receive end connection 78 of shaft 36 therein. A bearing 108 (e.g., needle bearing) is disposed between end connection 78 and intermediate shaft first end 102 to facilitate independent rotation between left output shaft 36 and intermediate shaft 44. Intermediate shaft second end 104 is disposed within right output shaft receiving bore 96 against biasing mechanism 100.

A curvic gear 110 is press-fit onto shaft 44, for example, at a splined portion of shaft 44, and curvic gear 110 is retained on shaft 44 at least partially by a retaining ring 112. As such, curvic gear 110 rotates with intermediate shaft 44. Curvic gear 110 includes curvic teeth 114 that selectively meshingly engage with curvic teeth 98 of right output shaft coupling portion 94. In addition, curvic gear 110 includes spline teeth 116 on an outer diameter thereof that are meshingly engaged with internal teeth 120 of second side gear 66 in both coupled and uncoupled positions of system 30.

Disconnect actuator 42 selectively forces or shifts left output shaft 36 from the uncoupled first position (FIG. 2) in the direction of arrow 118 to a coupled second position (FIG. 3) where curvic gear 82 meshingly engages side gear 64 and curvic gear 110 meshingly engages coupling portion 94, thereby connecting left output shaft 36 and right output shaft 38 for rotation with front differential 32. As such, front differential double disconnect system 30 has a first operating mode for a two-wheel drive operation of vehicle 10 and a second operating mode for a four-wheel drive operation of vehicle 10.

In the first operating mode, shafts 36, 38 are not coupled to front differential 32 and rotate independently. In this first operating mode, rolling movement of front wheels 40 does not drive front differential 32. In the second operating mode, where shafts 36 and 38 are rotatably coupled to front differential 32, front wheels 40 are operably coupled to engine 12.

A method of manufacturing front differential double disconnect system 30 includes providing front axle housing 34 with front differential 32, providing left output shaft 36, providing right output shaft 38, and providing intermediate shaft 44. Curvic gear 82 is coupled to shaft 36 and curvic gear 110 is coupled to shaft 44. Side gear 64 is provided with curvic teeth 70 to engage teeth 86 of curvic gear 82. Shaft coupling portion 94 is provided with curvic teeth 98 to engage teeth 114 of curvic gear 110, and curvic gear 110 is provided with spline teeth 116 to engage side gear 66. A needle bearing connection 108 is provided between left shaft 36 and intermediate shaft 44, and intermediate shaft 44 is biased apart from right shaft 38 with biasing mechanism 100. Shafts 36, 38, 44 are operably coupled to front differential 32 such that curvic gear 82 and curvic gear 110 selectively and respectively engage side gear 64 and coupling portion 94 when left shaft 36 is forced in the direction of arrow 118 by disconnect actuator 42.

Described herein are systems and methods for disconnecting both the left and right output shafts from a front differential in order to reduce losses within the axle housing and to improve efficiency and fuel economy. The system utilizes an intermediate shaft that extends through the center of the front differential, which allows an actuator to engage and disengage both differential side gears simultaneously. A typical cross shaft is removed such that the pinion gears include two separate, shorter posts. Further, the side gears utilize curvic connections to engage and disengage the output shafts. As such, both sides of the differential are disconnected when the vehicle is not in four-wheel drive. This results in losses due to differential gears/output shafts spinning in a typical differential when in two-wheel drive. Additionally, the disconnect is close to the main sump and mitigates typical lube flow issues that may occur when the disconnect is at a tube end, the curvic gears create a more power dense package and reduce connect/disconnect time because they require little travel to engage, and the curvic gears require less axial thickness, potentially allowing for a slimmer cross-vehicle package. In addition, use of a Curvic or Hirth gear removes rotational lash from the system, thereby reducing wear and improving overall system performance.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A front differential double disconnect system comprising:
    a front differential arranged within a front axle housing, the front differential having a first side gear comprising a first bevel gear and a second side gear comprising a second bevel gear, the first and second side gears being arranged within the front axle housing;
    a first shaft having a first gear configured to selectively engage the first side gear;
    a second shaft having a second gear; and a third shaft disposed between the first shaft and the second shaft, the third shaft having a third gear configured to engage the second side gear and selectively engage the second gear, wherein the first shaft is shiftable between a first position where the first gear does not engage the first side gear, and a second position where the first gear meshingly engages the first side gear to transmit rotational movement therebetween.

2. The system of claim 1, wherein the first shaft engages the third shaft such that when the first shaft shifts from the first position to the second position, the third shaft is shifted from an uncoupled first position where the third gear does not engage the second gear, to a coupled second position where the third gear meshingly engages the second gear to transmit rotational movement therebetween.

3. The system of claim 2, wherein the second shaft includes a receiving aperture to receive an end of the third shaft.

4. The system of claim 3, further comprising a biasing mechanism disposed in the receiving aperture configured to bias the third shaft into the first position.

5. The system of claim 1, wherein the first gear and the second gear are curvic gears or hirth gears.

6. The system of claim 5, wherein the first gear comprises a curvic first gear and the second gear comprises a curvic second gear, wherein the first side gear includes curvic teeth to engage the curvic first gear, and wherein the second side gear includes curvic teeth to engage the curvic second gear.

7. The system of claim 1, further comprising a bearing disposed between the first shaft and the third shaft such that first shaft and third shaft are configured to rotate independently of each other.

8. The system of claim 7, wherein the bearing is a needle bearing.

9. A vehicle comprising:
a body;
a front axle housing;
a front differential disposed in the front axle housing and having first side gear comprising a first bevel gear, and a second side gear comprising a second bevel gear, each of the first and second side gears being arranged in the front axle housing;
a first shaft having a first gear configured to selectively engage the first side gear;
a second shaft having a second gear; and
a third shaft disposed between the first shaft and the second shaft, the third shaft having a third gear configured to engage the second side gear and selectively engage the second gear,
wherein the first shaft is shiftable between a first position where the first gear does not engage the first side gear, and a second position where the first gear meshingly engages the first side gear to transmit rotational movement therebetween.

10. The vehicle of claim 9, further comprising a first road wheel coupled to the first shaft and a second road wheel coupled to the second shaft.

11. The vehicle of claim 9, wherein the first shaft engages the third shaft such that when the first shaft shifts from the first position to the second position, the third shaft is shifted from an uncoupled first position where the third gear does not engage the second gear, to a coupled second position where the third gear meshingly engages the second gear to transmit rotational movement therebetween.

12. The vehicle of claim 11, wherein the second shaft includes a receiving aperture to receive a portion of the third shaft.

13. The vehicle of claim 12, further comprising a biasing mechanism disposed in the receiving aperture configured to bias the third shaft into the first position.

14. The vehicle of claim 9, wherein the first gear and the second gear are curvic gears or hirth gears.

15. The vehicle of claim 14, wherein the first gear comprise a curvic first gear and the second gear comprises a curvic second gear, wherein the first side gear includes curvic teeth to engage the curvic first gear, and wherein the second gear includes curvic teeth to engage the curvic second gear.

16. The vehicle of claim 9, further comprising a bearing disposed between the first shaft and the third shaft such that first shaft and third shaft are configured to rotate independently of each other.

17. The vehicle of claim 16, wherein the bearing is a needle bearing.

18. The vehicle of claim 9, wherein the third shaft extends through a center of the front differential.

19. A method assembling a front differential double disconnect system, the method comprising:
providing a front differential arranged within a front axle housing having a first side gear and a second side gear, the first side gear and second side gear comprising first and second bevel gears arranged within the front axle housing;
providing a first shaft having a first gear configured to selectively engage the first side gear;
providing a second shaft having a second gear; and
disposing a third shaft between the first shaft and the second shaft, the third shaft having a third gear configured to engage the second side gear and selectively engage the second gear,
wherein the first shaft is shiftable between a first position where the first gear does not engage the first side gear, and a second position where the first gear meshingly engages the first side gear to transmit rotational movement therebetween.

* * * * *